United States Patent
Lee

[15] 3,643,332
[45] Feb. 22, 1972

[54] METHOD AND APPARATUS FOR RECORDING JAW MOVEMENTS

[72] Inventor: Robert L. Lee, 22937 Grand Terrace Road, Colton, Calif. 92324

[73] Assignees: Robert L. Lee; Arlene M. Lee; Gene W. Arant, Los Angeles, Calif., part interest to each

[22] Filed: June 24, 1969

[21] Appl. No.: 836,062

Related U.S. Application Data

[62] Division of Ser. No. 569,472, Aug. 1, 1966, Pat. No. 3,452,439.

[52] U.S. Cl. ................................................................32/19
[51] Int. Cl. ..............................................................A61c 9/00
[58] Field of Search ......................................32/19, 20, 21, 33

[56] References Cited

UNITED STATES PATENTS

| | | | |
|---|---|---|---|
| 1,622,910 | 3/1927 | Homer | 32/72 |
| 2,418,648 | 4/1947 | Kile | 32/19 |
| 2,434,415 | 1/1948 | Kile | 32/32 |
| 2,814,876 | 12/1957 | Stuzrt | 32/19 |
| 3,206,852 | 9/1965 | Swanson | 32/32 |
| 1,703,105 | 2/1929 | Hawksworth | 32/20 |
| 3,256,523 | 6/1966 | De Pietro | 32/19 |

*Primary Examiner*—Robert Peshock
*Attorney*—Beehler, Arant & Jagger

[57] ABSTRACT

The disclosed method consists in measuring the movements of the lower jaw (mandible) relative to the upper jaw by selecting two points a fixed distance apart on the horizontal axis of rotation of the subject's mandible, one on each side of subject's head and at substantially equal distances from the subject's head; recording the positions of the points relative to the subject's head when the jaws of the subject are in centric relation; and when the subject's mandible moves from centric relation, continuously measuring in three dimensions the position of each of the points relative to the position that it occupied in centric relation.

29 Claims, 5 Drawing Figures

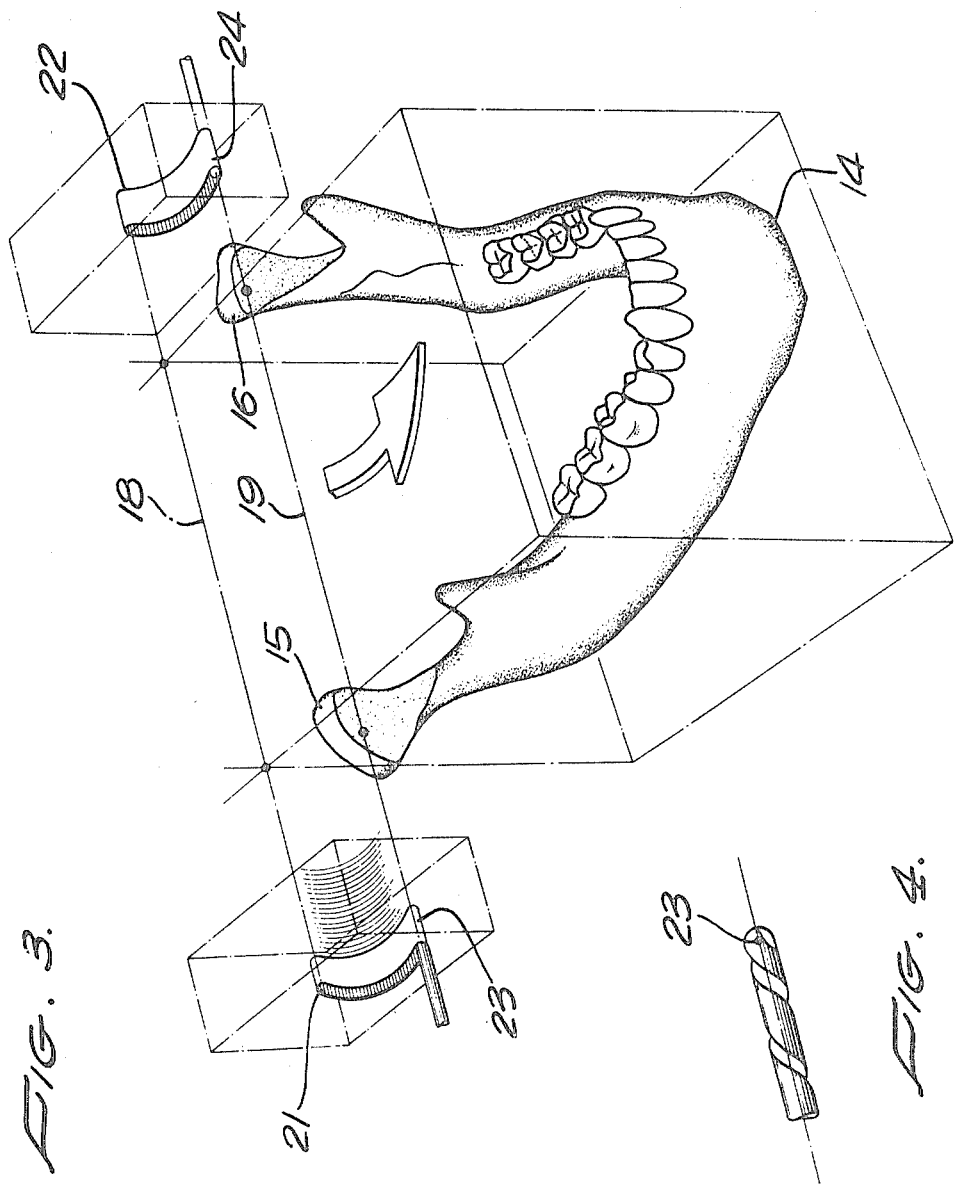

METHOD AND APPARATUS FOR RECORDING JAW MOVEMENTS

A method and apparatus for recording jaw movements of a human being are disclosed, primarily with reference to U.S. Pat. No. 3,452,439 of which this application is a division.

SUMMARY OF THE INVENTION

The disclosed jaw movement recording apparatus includes an upper face bow and a lower face bow, each having laterally positioned transducer elements for measuring the relative movement between the jaws. Each face bow is a rigid structure which supports its two lateral transducer elements in a fixed spatial relationship to each other as well as to the associated jaw of the subject. Each face bow is supported from the corresponding jaw of the subject by support means which is adjustable in three dimensions, in terms of both position and angle.

In the preferred form of the apparatus each transducer includes a solid record member which is attached to the upper face bow, and a stylus which is attached to the lower face bow.

In the preferred form of the apparatus there is also a third transducer located in a frontal position, including a solid record member attached to the upper face bow and a stylus attached to the lower face bow. The two lateral stylii are horizontally disposed and have their longitudinal axes located on a common center line, while the stylus of the frontal recorder is vertically disposed. The lateral record members have their recording surfaces vertically aligned and facing outward while the frontal record member has its recording surface horizontally aligned and facing downward.

According to the present invention the movements of the axis of the mandible (lower jaw) in its translated or rotated positions are measured relative to its location in the centric position. According to the preferred form of the invention transducer devices are utilized which are capable of measuring three-dimensional movement; that is to say, the movement of a single point of information is recorded in three dimensions, rather than recording the movements of two different points in two dimensions each. Furthermore, in accordance with the method of the present invention it is preferred to locate two transducers in lateral positions so that the points being measured are precisely aligned with the horizontal axis of rotation of the mandible. More specifically, an initial or reference position measurement is made when the mandible is in centric position so that the axis of the mandible coincides with what may be referred to as the terminal hinge axis, or axis of the maxilla. Thereafter as the mandible moves into translated and/or rotated positions the movements of two information points on its extended axis are measured relative to their original (centric position) locations.

The apparatus of the present invention preferably includes for each of the face bows, both upper and lower, a rigid structure which is capable of supporting the lateral transducer devices at a fixed separation distance. Each face bow is supported from a corresponding clutch by support means capable of three-dimensional adjustment, in terms of both distance and angle. The dentist who is recording the jaw movements therefore makes hand adjustments in the position of the face bow relative to the jaw of the subject, at the time of the initial alignment, but he does not disturb the fixed separation distance between the transducer elements.

DRAWING SUMMARY

FIG 3 is a perspective view illustrating the recording of the protrusive movement of the mandible in accordance with the preferred form of the invention;

FIG. 4 is a fragmentary perspective view of one of the drills utilized in FIG. 3.

IDENTIFICATION OF REFERENCED PATENT

Figure 1:
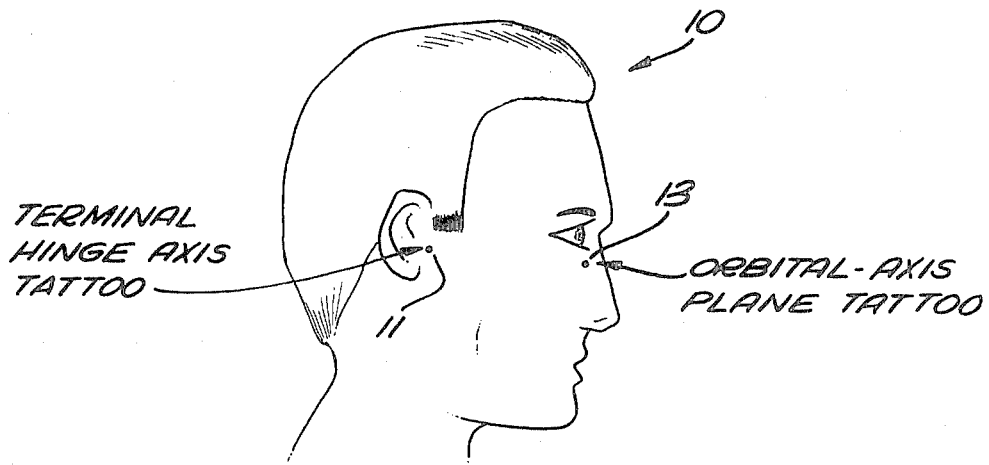
FIG. 1 is a side view of a dental patient on whom reference marks have been tattooed as a basis for making jaw movement recordings.
Figure 2:
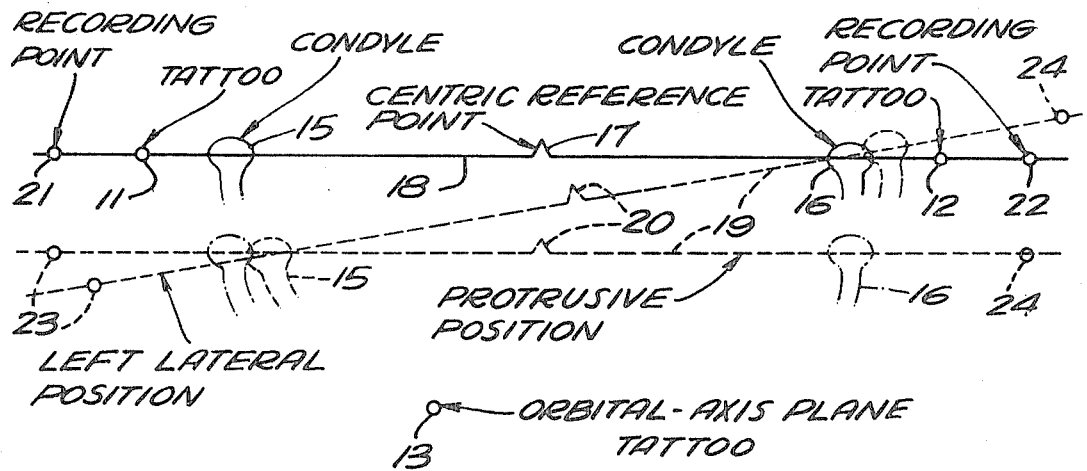
FIG. 2 is a schematic plan view illustrating how the present invention records the relative movements between the axis of the mandible and the terminal hinge axis.
Figure 5:
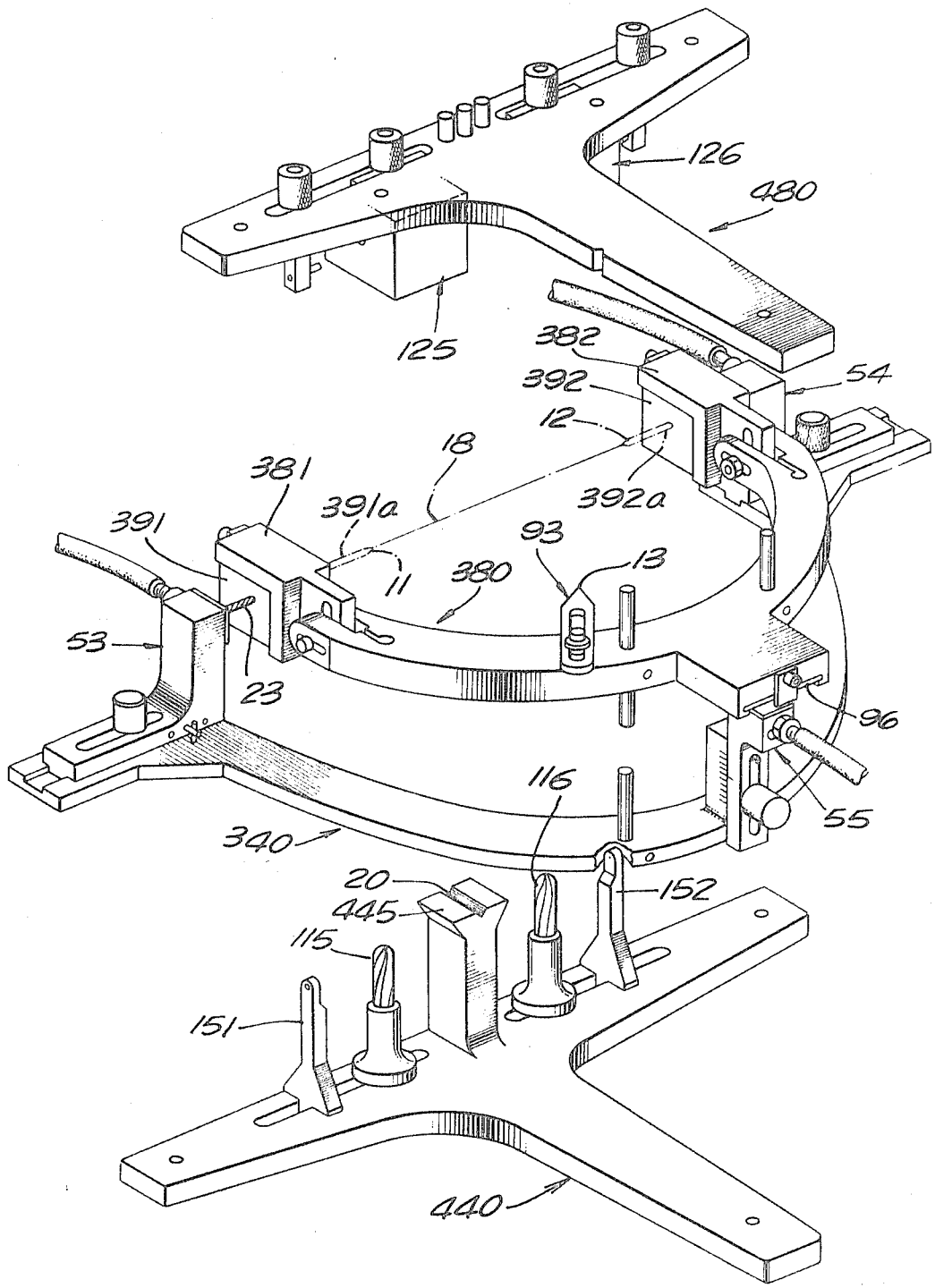
FIG. 5 is a perspective view of a presently preferred form of recording and transfer apparatus in accordance with the invention.

This application is a division of my prior copending application Ser. No. 569,472 filed Aug. 1, 1966, now U.S. Pat. No. 3,452,439 issued July 1, 1969. The drawing FIGS. 1 to 4, inclusive, of this present application are identical to drawing FIGS. 1 to 4, respectively, of the patent. Drawing FIG. 5 of this application is identical to drawing FIG. 79 of the patent. In the referenced patent a lower recording face bow having three recording stylii (rotating drills) is shown in FIG. 18 and also in FIGS. 50, 51, 52, and 55. Some earlier forms of the lower recording face bow, which are not now preferred, are shown in FIGS. 70, 75, 76, and 77 of the patent. A presently preferred form of the lower recording face bow is shown in FIG. 5 of this application (FIG. 79 of the patent).

An upper recording face bow in accordance with the invention is shown in FIGS. 32 to 41, inclusive, of the patent. Earlier forms of the upper recording face bow, not now preferred, are shown in FIGS. 71, 74 and 77 of the patent. Another form of upper recording face bow is shown in FIG. 5 of the present drawings (FIG. 79 of the patent).

Adjustable support means for supporting the face bows from the respective jaws of the subject are shown in FIGS. 5 to 17 inclusive, of the patent, and also to some extent in FIGS. 18, 34 and 40; and in their assembled relationship in FIGS. 50, 51 and 52.

In the patent the alignment of the upper face bow relative to the head, and the alignment of the lower face bow relative to the upper face bow, are described in connection with FIGS. 79, 80, and 82. The present drawing FIG. 5 (identical to patent drawing FIG. 79) provides an incomplete showing of this alignment procedure.

The entire specification and drawing of the referenced patent are incorporated herein for the purpose of disclosing the present invention.

What is claimed is:

1. The method of measuring jaw movements of a human subject for purposes of dentistry, comprising the steps of:
   selecting two points a fixed distance apart on the horizontal axis of rotation of the subject's mandible, one on each side of the subject's head and at substantially equal distances from the subject's head;
   recording the positions of said points relative to the subject's head when the jaws of the subject are in centric relation;
   and when the subject's mandible moves from centric relation, continuously measuring in three dimensions the position of each of said points relative to the position that is occupied in centric relation.

2. The method of claim 36 wherein a third point is selected in front of the subject's head in a fixed position relative to said two points, the position of said third point also being recorded when the jaws of the subject are in centric relation, and its position being continuously measured thereafter as the subject's mandible moves from the centric relation.

3. A method of recording relative movements of the jaws of a human subject, comprising the steps of:
   selecting a pair of three-dimensional movement recording devices, each of said recording devices including a record member capable of having physical impressions formed therein, and an associated stylus capable of forming such impressions;
   positioning said recording devices in laterally displaced positions on respective sides of the subject's head;
   fixedly securing said record members to each other and to the subject's upper jaw to move therewith;
   fixedly securing said stylii to each other and to the subject's lower jaw to move therewith;
   while the subject's jaws are in centric relation, adjusting the securements of said stylii so as to insert said stylii into said record members to thereby form initial impressions;

and, while the subject's jaws move through positions other than centric, maintaining the recording engagement of said stylii with said record members and at the same time maintaining a fixed separation distance between said stylii as well as a fixed separation distance between said record members.

4. The method of claim 3 wherein said stylii are horizontally aligned, and while the subject's jaws are in centric relation the longitudinal axes of said stylii are aligned with the extended horizontal axis of rotation of the lower jaw.

5. A method of recording the jaw movements of a human subject, comprising the steps of:
selecting a record member capable of having physical impressions formed therein, and placing said record member on the extended horizontal axis of rotation of the lower jaw;
selecting an elongated stylus;
while the subject's jaws are in centric relation, aligning said stylus with the extended horizontal axis of rotation of the lower jaw and inserting said stylus into said record member to thereby form an initial impression in said record member which represents centric;
and rigidly supporting said record member and said stylus from respective ones of the subject's jaws to move therewith in three dimensions, so that when the subject moves his jaws through positions other than centric additional impressions representing such movements are created in said record member.

6. The method claimed in claim 5 wherein said record member is formed of a hard plastic material, and the end of said stylus has grooves formed thereon to provide a drill, said drill being drivingly rotated to create said impressions.

7. The method claimed in claim 5 wherein said record member is secured to the upper jaw and said stylus is secured to the lower jaw.

8. The method claimed in claim 5 wherein said stylus is horizontally disposed and is secured to the lower jaw, said record member is secured to the upper jaw, and the longitudinal axis of said stylus is initially aligned with the extended horizontal axis of rotation of the lower jaw and thereafter remains aligned with the axis of the lower jaw in its translated or rotated positions.

9. The method claimed in claim 8 wherein said record member is formed of hard plastic material, and said stylus has grooves formed therein for providing a drill which is drivingly rotated to create said impressions.

10. The method claimed in claim 9 wherein said stylus has a hemispherical end, said grooves being of helical configuration.

11. The method claimed in claim 8 wherein two said record members and two said stylii are employed, one on each side of the subject' face.

12. The method claimed on claim 11 wherein a fixed separation distance is maintained between the ends of said stylii, and a fixed separation distance is also maintained between said record members, while the subject moves his jaws through positions other than centric.

13. A method of recording jaw movements intermediate to the border movements of a human subject, comprising the steps of:
selecting upper and lower face bows and securing them to the subject's jaws;
selecting a pair of lateral recording devices and attaching them to the face bows on respective sides of the subject's face;
attaching to one of the face bows, in front of the subject's mouth, a guide means having a slot formed therein which extends in the direction of the desired movements;
attaching to the other of the face bows a frontal guide pin adapted to engage said slot;
and inserting said pin into said slot while at the same time placing said recording devices in operative condition;
whereby subsequent movement of the subject's lower jaw will follow a predetermined path of movement which will be recorded by said recording devices.

14. An instrument for measuring the jaw movements of a human subject, comprising:
upper and lower face bows;
means for securing said face bows to the subject's upper and lower jaws, respectively, to move therewith;
a pair of recording devices situated on respective sides of the head, each including a record member capable of having physical impressions formed therein, and an elongated recording stylus for forming such impressions;
means rigidly supporting said record members from said upper face bow at a fixed separation distance from each other and so that they encompass the area of hinge axis movements;
and means rigidly supporting said recording stylii from said lower face bow with a fixed separation distance between them and in precise longitudinal alignment with each other;
said securing means for said lower face bow being both positionally and angularly adjustable in three dimensions so that the common longitudinal axis of said stylii may be precisely aligned with the extended horizontal axis of the lower jaw of the subject when his jaws are in centric relation.

15. An instrument as claimed in claim 14 wherein said support means for each said stylus includes a carriage which is slidably movable for adjusting the longitudinal position of said stylus without disturbing its longitudinal alignment.

16. An instrument as claimed in claim 14 wherein said record members are formed of rigid plastic material, said stylii are grooved to form drills, and which additionally includes drive means for rotating said drills to cut said rigid plastic material.

17. An instrument as claimed in claim 14 which includes means for positioning said stylii ends, when the subject's jaws are in centric relation, at precisely equal distances from the respective sides of the subject's head.

18. An instrument as claimed in claim 14 wherein each of said record members has an outwardly facing, vertically disposed recording surface.

19. An instrument as claimed in claim 14 which further includes a third recording device which is frontally located, said third recording device including an additional record member supported from said upper face bow and an additional stylus supported from said lower face bow.

20. An instrument as claimed in claim 19 wherein said additional stylus extends vertically upward and said additional record member has a downwardly facing, horizontally disposed recording surface.

21. In an instrument for recording jaw movements, the combination comprising:
a rigid face bow adapted to encircle one of the jaws of a human subject;
means for securing said face bow to the jaw to move therewith;
a pair of recording stylii carriages;
an elongated recording stylus supported from each of said carriages;
means supporting said carriages in slidable relationship to said face bow such that the longitudinal axes of said stylii are maintained in mutual alignment regardless of the positions of said carriages;
an and three-dimensional position and angle adjustment means cooperatively associated with said face bow and said securing means and adapted to establish a selected position of said face bow relative to the jaw.

22. The instrument claimed in claim 21 which also includes separate locking means associated with each of said carriages whereby the ends of said stylii may be locked at a fixed separation distance.

23. Jaw movement recording apparatus comprising, in combination:
an upper face bow having a set of record members rigidly secured thereto;

three-dimensionally-adjustable means for supporting said upper face bow from the upper jaw;

a lower face bow having a set of stylii secured thereto;

means for supporting said stylii from said record members in a predetermined position of alignment relative thereto, thereby to support the weight of said lower face bow from the upper jaw;

and separate means for attaching said lower face bow to the lower jaw in a selected position of adjustment relative thereto.

24. In jaw movement recording apparatus, the combination comprising:

a rigid face bow having a generally horseshoe-shaped configuration;

a pair of transducer elements rigidly affixed to respective extremities of said face bow;

and three-dimensionally-adjustable support means cooperatively associated with said face bow and adapted for supporting the same from the corresponding jaw of the patient;

said support means being adjustable so that said transducer elements may be precisely aligned on the hinge axis of the corresponding jaw of the patient without changing the fixed separation distance between them, the rigid structure of said face bow thereafter serving to rigidly support said transducer elements in their aligned relationship.

25. Jaw movement recording apparatus as claimed in claim 24 wherein said face bow is an upper face bow, and said support means includes an upper clutch and a pair of rods having their lower ends attached to said clutch and their upper ends slidably positionable in respective vertical openings in said face bow.

26. Jaw movement recording apparatus as claimed in claim 24 wherein said face bow is a lower face bow, and said support means includes a lower clutch, a U-bolt supported from said clutch and having forwardly projecting legs, and a pair of position adjustment members coupling the associated sides of said face bow to respective legs of said U-bolt.

27. In jaw movement recording apparatus, the combination comprising:

a lower clutch having a vise grip at its forward extremity;

a U-bolt having its base part horizontally disposed within said vise grip, the legs of said U-bolt projecting horizontally forwardly from said vise grip to provide a parallel pair of position adjustment rods;

a generally horseshoe-shaped lower face bow;

and a pair of position adjustment members secured adjacent said face bow on respective sides of its lateral center, each of said members cooperating with the associated position adjustment rod for establishing a selected positional and angular three-dimensional relationship of said face bow to said clutch.

28. In a jaw movement recording instrument, hinge axis alignment means comprising an upper face bow having two rearward ends, a pair of alignment blocks each having a lateral opening therethrough, means for fixedly attaching said blocks to respective ends of said face bow, pins slidably received by said block openings for aligning said block openings and hence said upper face bow relative to a pair of marks on the patient's head, and a lower face bow having a pair of retractable horizontal stylii insertable in respective ones of said openings for aligning said lower face bow relative to said upper face bow.

29. The method of aligning a face bow relative to the axis of the mandible so as to maintain its alignment while the mandible moves, comprising the steps of:

1. fixedly positioning a first pair of physical markers relative to the cranium on respective sides of the face to indicate the hinge axis
2. selecting a face bow having a second pair of physical markers to indicate the axis
3. aligning the second pair of markers relative to the first pair and then fixing the position of the face bow relative to the cranium
4. guiding the mandible into centric relation position
5. while maintaining centric relation position, fastening the face bow relative to the mandible
6. and thereafter releasing the face bow from the cranium so that it is free to move with the mandible.

* * * * *

UNITED STATES PATENT OFFICE
CERTIFICATE OF CORRECTION

Patent No. 3,643,332  Dated February 22, 1972

Inventor(s) Robert L. Lee

It is certified that error appears in the above-identified patent and that said Letters Patent are hereby corrected as shown below:

Column 2, line 53, (the last line of Claim 1) change "is" to --it--.

Column 2, line 54, (the first line of Claim 2) change "36" to --1--.

Column 3, line 53, (the first line of Claim 12) change "on" to --in--.

Column 4, line 64, (the last paragraph of Claim 21) delete "an" at the commencement of the line.

Signed and sealed this 20th day of June 1972.

(SEAL)
Attest:

EDWARD M. FLETCHER, JR.
Attesting Officer

ROBERT GOTTSCHALK
Commissioner of Patents